United States Patent
Yu et al.

(10) Patent No.: US 8,310,485 B1
(45) Date of Patent: *Nov. 13, 2012

(54) CREATING ANIMATION EFFECTS

(75) Inventors: Fan Yu, Cupertino, CA (US); Kit Kwan, Kuala Lumpur (MY); Doug Benson, Burlingame, CA (US); San Khong, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/028,927

(22) Filed: Feb. 16, 2011

Related U.S. Application Data (63) Continuation of application No. 11/681,141, filed on Mar. 1, 2007, now Pat. No. 7,898,542.

(60) Provisional application No. 60/778,337, filed on Mar. 1, 2006.

(51) Int. Cl.
*G06T 13/00* (2011.01)

(52) U.S. Cl. ........ 345/473; 345/474; 345/501; 382/103; 463/30; 463/43; 715/723; 725/39; 725/50

(58) Field of Classification Search ............... 345/473, 345/474, 501; 382/103; 463/30, 43; 715/723; 725/39, 50
See application file for complete search history.

(56) References Cited

U.S. PATENT DOCUMENTS

| | | | |
|---|---|---|---|
| 5,261,041 A | 11/1993 | Susman | |
| 5,384,912 A | 1/1995 | Ogrinc et al. | |
| 5,764,241 A | 6/1998 | Elliott et al. | |
| 6,462,742 B1 * | 10/2002 | Rose et al. | 345/473 |
| 6,611,268 B1 | 8/2003 | Szeliski et al. | |
| 6,738,065 B1 | 5/2004 | Even-Zohar | |
| 6,902,481 B2 | 6/2005 | Breckner et al. | |
| 7,006,881 B1 * | 2/2006 | Hoffberg et al. | 700/83 |
| 7,019,748 B2 * | 3/2006 | Raskar | 345/473 |
| 7,027,054 B1 * | 4/2006 | Cheiky et al. | 345/473 |
| 7,091,975 B1 * | 8/2006 | Cohen et al. | 345/473 |
| 7,142,209 B2 | 11/2006 | Uyttendaele et al. | |
| 7,221,366 B2 | 5/2007 | Uyttendaele et al. | |
| 7,426,734 B2 * | 9/2008 | Debique et al. | 719/310 |
| 7,427,991 B2 | 9/2008 | Bruderlin et al. | |
| 7,432,940 B2 | 10/2008 | Brook et al. | |
| 7,500,190 B1 | 3/2009 | Bhatt | |
| 7,511,718 B2 * | 3/2009 | Subramanian et al. | 345/619 |
| 7,565,608 B2 | 7/2009 | Faraday et al. | |
| 7,594,180 B1 | 9/2009 | Langmacher et al. | |
| 7,598,951 B2 * | 10/2009 | Lee et al. | 345/419 |
| 7,657,060 B2 | 2/2010 | Cohen et al. | |
| 7,688,323 B2 * | 3/2010 | Ferguson et al. | 345/473 |
| 7,813,822 B1 * | 10/2010 | Hoffberg | 700/94 |

(Continued)

*Primary Examiner* — Kimbinh T Nguyen
(74) *Attorney, Agent, or Firm* — Fish & Richardson P.C.

(57) ABSTRACT

This specification describes technologies that relate to creating animation effects in an animation at runtime and without requiring the animation effects to be stored in every frame or time instance of the animation. In general, one aspect of the subject matter described in this specification can be embodied in a method that includes obtaining animation information having a primary object and a first effect object associated with the primary object. The method also includes generating an animation sequence using the animation information. The animation sequence includes the primary object on which the first effect object and a second effect object can be applied. The act of generating an animation sequence includes interpolating between the first and second effect objects to create at least one intermediate effect applied to the primary object in the animation sequence. Other embodiments of this aspect include corresponding systems, apparatus, and computer program products.

23 Claims, 4 Drawing Sheets

U.S. PATENT DOCUMENTS

| | | | |
|---|---|---|---|
| 7,831,088 B2 * | 11/2010 | Frakes et al. | 382/154 |
| 7,852,370 B2 * | 12/2010 | Peleg et al. | 348/36 |
| 7,904,187 B2 * | 3/2011 | Hoffberg et al. | 700/83 |
| 2006/0148569 A1 | 7/2006 | Beck | |
| 2006/0253868 A1 | 11/2006 | Ludvig et al. | |
| 2006/0262184 A1 | 11/2006 | Peleg et al. | |
| 2009/0249393 A1 | 10/2009 | Shelton et al. | |
| 2010/0146393 A1 * | 6/2010 | Land et al. | 715/723 |

* cited by examiner

CREATING ANIMATION EFFECTS

PRIOR APPLICATIONS

This application is a continuation of U.S. application Ser. No. 11/681,141, filed on Mar. 1, 2007 now U.S. Pat. No. 7,898,542, which claims priority to U.S. Application Ser. No. 60/778,337, filed on Mar. 1, 2006. The disclosures of the prior applications are considered part of the disclosure of this application and are incorporated by reference in their entirety.

BACKGROUND

The present disclosure relates to creating animation effects for animated objects in an animation.

Animation effects applied to animated objects can add a great deal of realism and detail to an animation. For example, an object moving on a stage can appear to be much more realistic if an animation effect such as a drop shadow is applied to it. Conventional animations are displayed as a series of rapidly displayed frames in an animation sequence with animation effects included for every frame of the animation.

SUMMARY

This specification describes technologies that relate to creating animation effects in an animation at runtime and without requiring the animation effects to be stored in every frame or time instance of the animation.

In general, one aspect of the subject matter described in this specification can be embodied in a method that includes obtaining animation information having a primary object and a first effect object associated with the primary object. The method also includes generating an animation sequence using the animation information. The animation sequence includes the primary object on which the first effect object and a second effect object can be applied. The act of generating an animation sequence includes interpolating between the first and second effect objects to create at least one intermediate effect applied to the primary object in the animation sequence. Other embodiments of this aspect include corresponding systems, apparatus, and computer program products.

Another aspect of the subject matter described in this specification can be embodied in a system that includes a user interface device; and one or more computers operable to effect a runtime media player and to interact with the user interface device in order to use the media player to perform operations that include obtaining animation information comprising a primary object and a first effect object associated with the primary object, and generating an animation sequence in the runtime media player using the animation information. The animation sequence includes the primary object on which the first effect object and a second effect object can be applied. The act of generating the animation sequence includes interpolating between the first and second effect objects to create at least one intermediate effect applied to the primary object in the animation sequence.

These and other embodiments can optionally include one or more of the following features. The method can include creating the second effect object based on the first effect object when the animation information does not include the second effect object. The act of creating the second effect object can include obtaining one or more parameters for an animation effect associated with the first effect object. The act of creating the second effect object can also include associating the one or more parameters with the second effect object and defining the one or more parameters to be zero.

The act of obtaining animation information can include receiving the animation information in a media player. The act of obtaining animation information can also include obtaining the animation information including the second effect object associated with the primary object. The act of generating an animation sequence can include interpolating dynamically in the media player during generation of the animation sequence. The act of obtaining animation information can further include receiving a user-specified number of intermediate frames (or intermediate time instances) between a first frame (or first time instance) associated with the first effect object and a second frame (or second time instance) associated with the second effect object. The intermediate frames (or intermediate time instances) can correspond to the at least one intermediate effect. The first frame (or first time instance) can be produced before the second frame (or second time instance) in the animation sequence. Alternatively, the second frame (or second time instance) can be produced before the first frame (or first time instance) in the animation sequence.

The act of interpolating can include producing the intermediate frames (or intermediate time instances) sequentially in the animation sequence based on a frame position (or time difference) relative to the first and the second frames (or time instances). The act of interpolating can also include performing an interpolation of the animation information associated with the first and the second frames (or time instances) based on an interpolation function. The interpolation function can be selected from a group including a linear function, an exponential function, and a user-specified function. Each of the first and second effect objects can include one or more parameters for an animation effect. The animation effect can include a drop shadow effect, a blur effect, a bevel effect, a glow effect, a gradient glow effect, a gradient bevel effect, or other effects. The one or more parameters associated with the effect objects can be dimension, color, location, shape, orientation, edge sharpness, pixel range, or other parameters.

The one or more computers can include a server operable to interact with the user interface device through a data communication network, and the user interface device can be operable to interact with the server as a client. The user interface device can include a computer running a Web browser, a mobile telephone running a wireless application protocol (WAP) browser, or a personal digital assistant (PDA) running a WAP browser. Moreover, the one or more computers can include one personal computer, and the personal computer can include the user interface device.

Particular embodiments of the subject matter described in this specification can be implemented to realize one or more of the following advantages. Animation effects can be readily created for animated objects dynamically at runtime in which user time and energy can be minimized. Further, animation effects can be achieved without increasing the amount of storage required to display the animation. The increased storage capacity associated with the animation effects can be avoided because the effects need not be stored in every frame or instance of the animation. Thus, for example, if the animation is downloaded from a server to a client computer system, the animation effects do not add time to the download process or cause authors to forgo the realism and other benefits that animation effects can achieve.

A realistic animation effect can be achieved for an animation by specifying the animation effects at the start frame and the end frame of the key frames or at the first time instance and the second time instance in an animation. Further, a realistic and complex animation sequence can be achieved by having a user specify two or more key frames and a number of intermediate frames between each key frame pair in the animation sequence. For example, the user can specify one animation effect for the first key frame pair and another animation effect for a second key frame pair in an animation sequence. Additionally, a user can specify an animation effect for one of the key frames in an animation and a dummy effect can be automatically generated to ensure that the animation effect evolves smoothly between the key frames.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
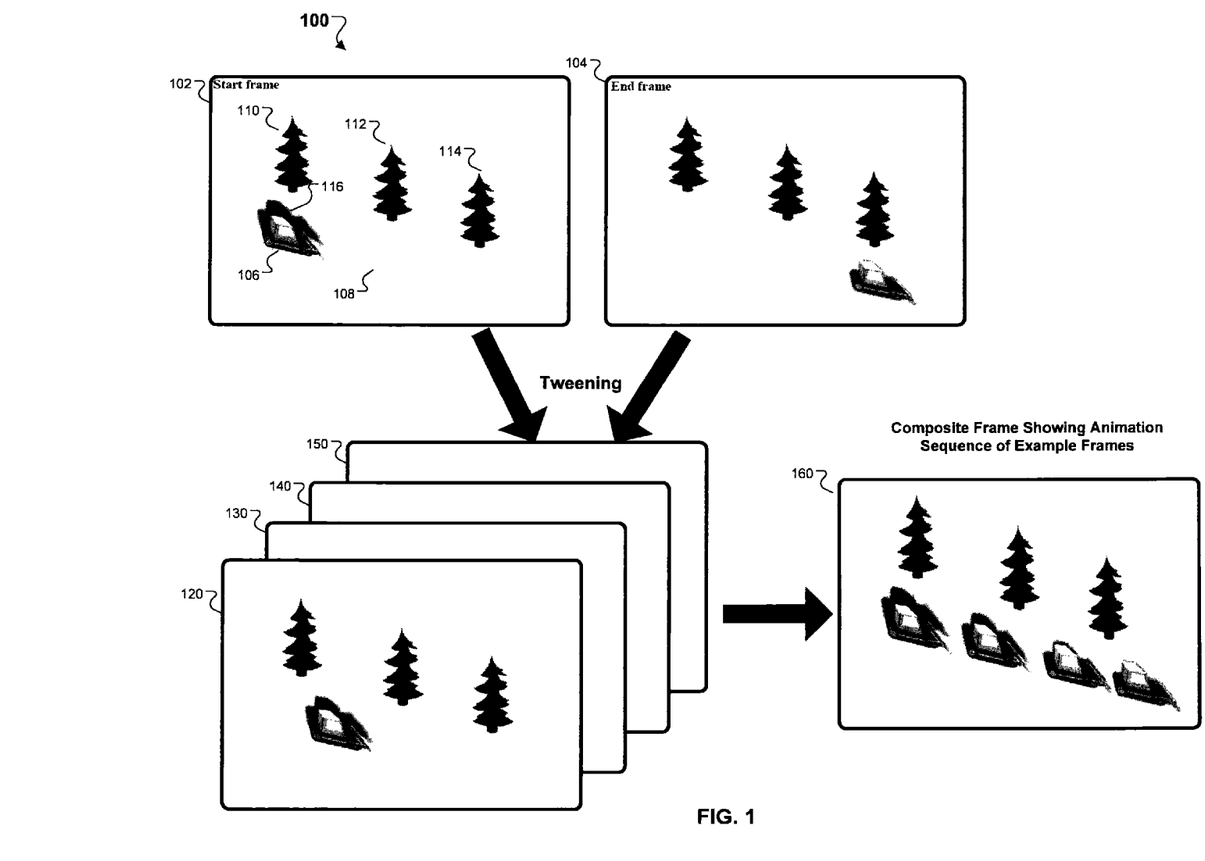
FIG. 1 shows a conceptual diagram of a system that dynamically creates animation effects at runtime for animated objects in an animation.

FIG. 1 shows a conceptual diagram of a system 100 that dynamically creates animation effects at runtime for animated objects in an animation. The system 100 and its associated methods permit users to create animation effects for one or more animated objects ("primary objects") in an animation simply by specifying animation information for at least one frame of the key frames, which are the essential frames in defining a movement in an animation. Alternatively, the system 100 can be applied to animations that are not frame-based. For example, an animation can be time-based rather than frame-based, and system 100 can create animation effects by obtaining animation information for at least one time instance in an animation sequence.

As an example of the frame-based animation, FIG. 1 shows a start frame 102 and an end frame 104, which form a pair of key frames in an animation sequence. In this example, the animation depicts a vehicle 106 entering from the left side of the road 108 and moving towards the right side of the road 108. The start frame 102 of the key frames can include one or more primary objects including, for example, the vehicle 106, the road 108, and trees 110, 112, 114.

The system 100 allows a user to specify one or more primary objects on which animation effects can be applied. As an example, suppose that the user desires to add an animation effect in the form of a drop shadow effect 116 to the vehicle 106. Additionally, suppose that the user desires for the drop shadow effect 116 to disappear when the vehicle 106 reaches the right side of the road 108 at the end frame 104. Using system 100, the user can specify the primary object of interest, which is the vehicle 106, in the start frame 102, and select the drop shadow effect 116, e.g., from a menu of potential animation effects. The animation effects can include a drop shadow effect, a blur effect, a bevel effect, a glow effect, a gradient glow effect, and a gradient bevel effect. After selecting the drop shadow effect 116, the user can specify what parameters to apply to the drop shadow 116, e.g., the angle, the distance, and the color of the drop shadow 116.

Once the parameters of the drop shadow effect 116 are specified for the vehicle 106, the system 100 stores the drop shadow effect 116 and its associated parameters as an effect object. Additionally effect objects can be created when the user selects additional animation effects to apply to the vehicle 106 and specifies parameters associated with that animation effect. Moreover, an effect object can be created for a second primary object when the user specifies the second primary object and selects an animation effect to apply to that second primary object. In this manner, multiple effect objects can be defined and associated with one or more primary objects in the animation.

Once the effect objects and primary objects are defined for the start frame 102, the user may then specify the parameters for the corresponding effect objects in the end frame 104. For example, the user may specify that the distance of the drop shadow effect 116 to be zero in order to show that the drop shadow has disappeared. Alternatively, if the user does not specify any parameters for the drop shadow effect 116 in the end frame 104, the system 100 can automatically generate a dummy effect object with the parameters set to zero. As an example, suppose that the user selects a blur effect and specifies blur parameters of 30 pixel range for both x and y directions in the start frame. If the user does not select the blur effect or specify any parameter for the blur effect in the end frame, the system 100 can insert a dummy effect object having the blur effect but with parameters for that effect set to zero. Thus, for example, in the animation sequence, the animated object will start out having a blur effect and gradually appear less and less blurred, until the blur effect disappears in the end frame. In this manner, the user only needs to specify parameters for the effect object in one of the two key frames in order to create an animation effect.

Thus, for example, if the user had selected a blur effect for the vehicle 106 in the end frame 104 and specified parameters for the blur effect. The user does not have to go back to the start frame 102, select the blur effect, and specify the parameters for the blur effect. This is because the system 100 can automatically create a dummy blur effect in the start frame 102 associated with the vehicle 106 by specifying that the parameters for the dummy effect object to be zero.

After the primary object and the associated effect objects have been defined for the key frames, the system 100 can then generate the animation sequence by "tweening" based on the key frames for a user-specified number of intermediate frames. Tweening is used herein to refer to the process of generating intermediate frames between the key frames in an animation to give the appearance that the image in the first frame evolves smoothly into the image in the second frame. The system 100 can perform tweening based on an interpolation between the effect object of the start frame and the effect object of the end frame. The degree of smoothness from the start frame 102 to the end frame 104 can depend on the number of intermediate frames that the user specifies. For example, if the user were to specify only one intermediate frame between the start frame 102 and the end frame 104, then the animation sequence would look abrupt and unrealistic because the vehicle 106 and its associated effect object 116 would appear to jump from the left side of the road 108, to the middle of the road 108, and then to the right side of the road 108.

On the other hand, if the user were to specify a sufficient number of intermediate frames, e.g., intermediate frames 120, 130, 140, 150, then the animation sequence can evolve smoothly. For example, the intermediate frame 120 shows that the vehicle 106 has moved away from its starting position in the start frame 102. Additionally, the effect object (i.e. drop shadow effect) 116 has also evolved from a longer shadow distance to a shorter shadow distance. This smooth transition of the vehicle 106 and the drop shadow effect 116 from the start frame 102 to the end frame 104 can be shown by way of an example composite image 160, which superimposes four different frames (including the key frames and two intermediate frames) to show the animation sequence. As shown in the composite image 160, the vehicle 106 appears to gradually move from the left side of the road 108 to the right side of the road 108. Moreover, the drop shadow effect 116 slowly decreases and disappears entirely when the vehicle 106 reaches the right side of the road 108. Therefore, the system 100 allows a user to specify just one of the key frames in an animation, and smooth animation effects can be achieved without requiring the animation effects to be stored in every frame of the animation.

Figure 2:
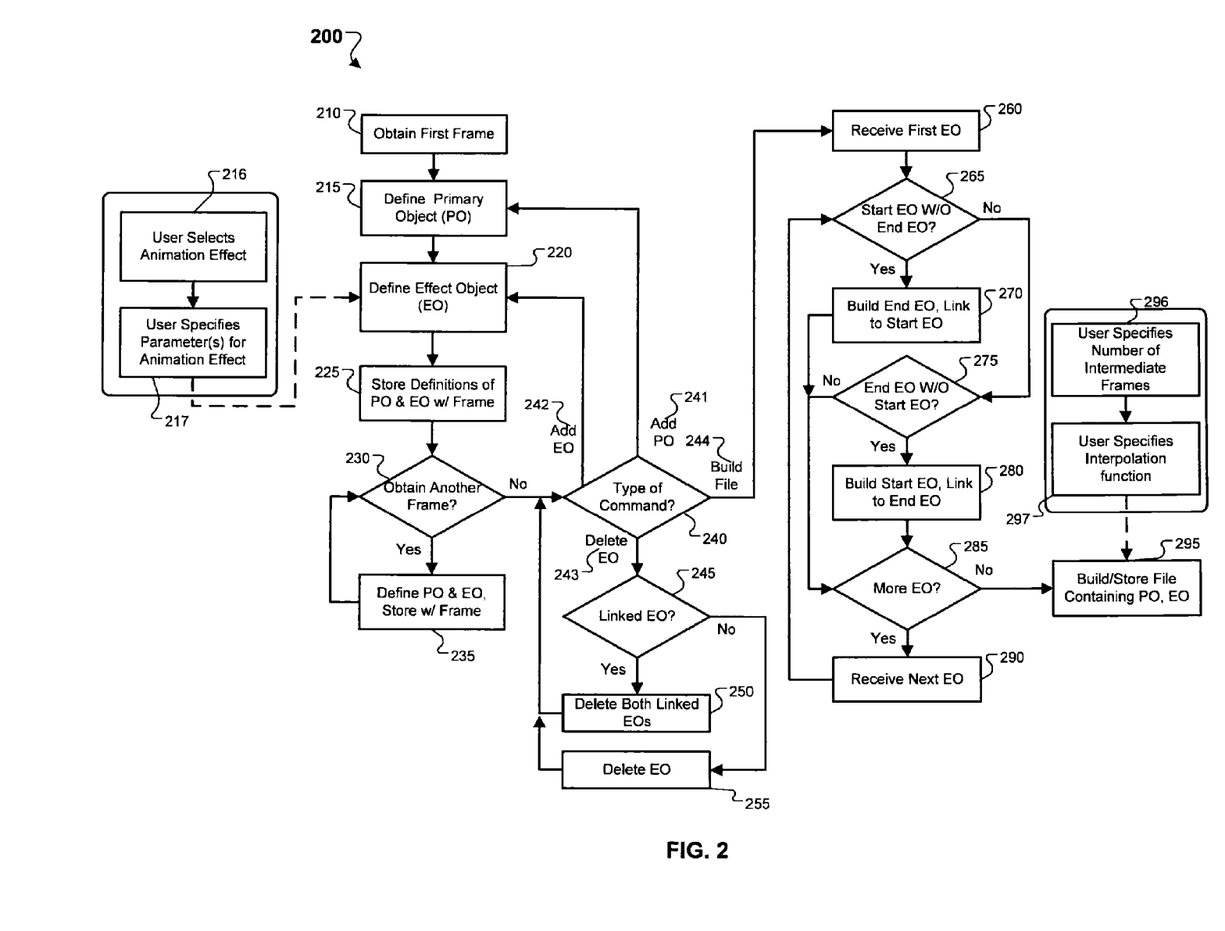
FIG. 2 is a flow chart showing an example process of creating animation effects based on user-specified animation information.

FIG. 2 is a flow chart showing an example process 200 of creating animation effects based on user-specified animation information. At 210, the user obtains the first frame of the key frames in an animation in order to specify animation information. The first frame can be the start frame or the end frame of the key frames in the animation. The animation information can include primary objects and their associated effect objects to be applied to the primary objects. The animation information can also include the parameters for each effect object. At 215, the user defines in the first frame the primary object on which animation effects can be applied. The primary object can be any image object or a group of images objects. For example, in FIG. 1, the primary object can be just the vehicle 106, or the vehicle 106 and the tree 110. At 216, the user selects an animation effect to be applied to the primary object. The animation effect can be selected from a drop-down menu, which can include animation effects such as a drop shadow effect, a blur effect, a bevel effect, a glow effect, a gradient glow effect, a gradient bevel effect, or other effects. At 217, the user specifies parameters for the selected animation effects. For example, for the blur effect, the user may specify the number of pixels in the x and y directions to blur.

At 220, the effect object associated with the primary object is defined. At 225, the primary object and effect object including the associated parameters are stored with the first frame. At 230, process 200 determines whether a second frame of the key frames needs to be obtained in order to specify animation information for the animation. The second frame can be the start frame or the end frame of the key frames. However, if the first frame is the start frame, then the second frame will be the end frame; and if the first frame is the end frame, then the second frame will be the start frame. If the second frame needs to be obtained, at 235, the primary object, the effect object, and parameters associated with the effect object are defined and then stored with the second frame.

If, on the other hand, a second frame need not be obtained of is already obtained, then the process 200 receives various types of commands. If the command 241 is to add a new primary object in the first frame, the process 200 will repeat at 215. The user then defines a new primary object on which animation effects can be applied. If the command 242 is to add another effect object to the primary object, the process 200 will repeat at 220. The user then selects an animation effect and specifies one or more parameters associated with the animation effect.

If the command 243 is to delete an effect object, then process 200 determines, at 245, whether the effect object is linked with another effect object in the key frames. For example, if the effect object to be deleted is a glow effect for the end frame of the key frames, the process 200 will determine whether a glow effect has been defined for the start frame of the key frames and linked with the glow effect of the end frame. At 250, if the effect objects are linked, then the effect objects in both the start and end frames of the key frames are deleted. On the other hand, if the effect object is not linked, at 255, process 200 will delete just the effect object of the first frame.

At 240, if the command 244 is to build an animation file, then process 200 will, at 260, receive a first effect object. The first effect object can be an effect object associated with the start frame or the end frame of the key frames. At 265, process 200 determines whether this first effect object is an effect object of the start frame ("Start EO") that is not associated with an effect object of the end frame ("End EO"). At 270, if the effect object is a Start EO without End EO, then process 200 builds End EO by automatically generating a dummy effect object for the end frame. Additionally, process 200 automatically links the built End EO with the received Start EO. If the first effect object is not a Start EO without End EO, then process 200, at 275, determines whether the first effect object is an End EO without Start EO. At 280, if the first effect object is an End EO without Start EO, then process 200 builds Start EO by automatically generating a dummy effect object for the start frame. Additionally, process 200 automatically links the built Start EO with the received End EO.

Thus, in some implementations, the user may specify a first effect object with one set of parameters at the start frame of a pair of key frames, and a second effect object with another set of parameters at the end frame, with the intention that both effect objects will produce smooth transitions from the start frame to the end frame. In that event, the process 200 can create and insert at the start frame a dummy effect object corresponding to the second effect object, but with the parameters for the dummy effect object set to zero. For example, if the second effect object at the end frame is a drop shadow effect with a specified shadow distance, the dummy shadow effect created by the process 200 will have the shadow distance set to zero. In this manner, the shadow effect can seem to appear gradually from the start frame to the end frame.

Similarly, at the end frame, the process 200 can create and insert a dummy effect object corresponding to the first effect object defined at the start frame. The parameters for this dummy effect will also be set to zero. For example, if the first effect object at the start frame is a blur effect with specified number of pixels to be blurred in both the x and y directions, the dummy shadow effect created by the process 200 at the end frame will have the number of pixels to be blurred set to zero. In this manner, the blur effect can seem to disappear gradually from the start frame to the end frame. When the process 200 creates the dummy effect objects in this manner, they are associated with the user-defined effect objects. Thus, for example, if the user deletes a user-defined effect object, the corresponding and linked dummy effect object created by the process 200 will be deleted by the process 200.

At 285, the process 200 determines whether there are more effect objects to be retrieved. If there are more effect objects, then at 290, process 200 receives the next effect object and repeats at 265 to determine whether the received next effect object is a Start EO without End EO or an End EO without Start EO. Once there are no more effect objects to be retrieved, process 200, at 295, builds the animation file containing the defined primary object, effect objects, and parameters associated with the effect objects. Additionally, at 296, the user specifies a number of intermediate frames for each pair of key frames. This user-specified number of intermediate frames can be used in rendering of the animation in the authoring tool and the media player. At 297, the user can also specify an interpolation function to be used in rendering the intermediate effects of the intermediate frames.

This interpolation function can be a predefined function, e.g., a linear function or an exponential function, or a user-specified function. This interpolation function can be selected from a drop-down menu of interpolation function or manually specified by the user. For instance, an interpolation between two or more animation effects that changes parameters non-linearly, randomly or in any other user-specified manner can be achieved. Additionally, the user can use a linear interpolation or a weighted interpolation that speeds up or slows down the tweening based on a value entered by the user. Alternatively, the user can draw an interpolation curve that allows for specialized interpolation functions including, e.g., allowing the transition to appear to "double back" on itself. For example, a shadow effect can appear to grow longer, then shorter, then longer again.

At 295, process 200 stores the built animation file in a format that can be read by a media player. For example, the file format can be a .swf file format and the media player can be a FLASH Media Player, available from Adobe Systems, Incorporated of San Jose, Calif. Once the animation file is built by a user, the animation file can then be transferred, e.g., by downloading, to a media player. For each sequential (in the order of the animation) pair of effect objects for the same primary object, the media player can identify the differences between the two effect objects and the number of intermediate frames between the key frames. The media player can then interpolate the parameters of the effect objects and, based on the frame position in the animation sequence being displayed and its relative position to the key frames, render the effect object in every frame in the animation sequence including the intermediate frames and the key frames.

Figure 3:
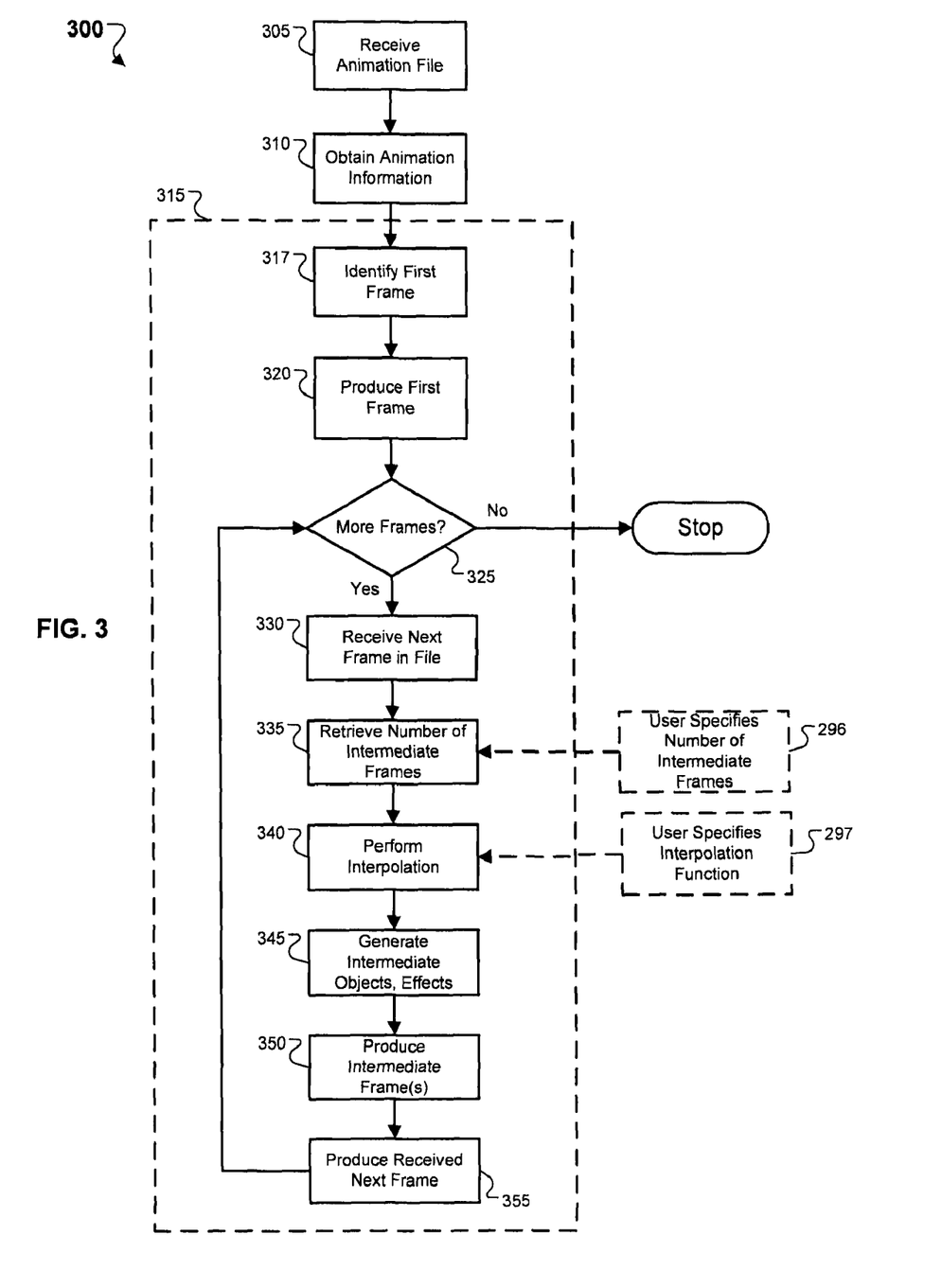
FIG. 3 is a flow chart showing an example process of generating an animation sequence dynamically at runtime by a media player.

For example, in an animation containing a series of frames, a shadow of a building growing over time can be defined at the start frame and the end frame of the key frames in an animation, with the distance and color of the shadow in the end frame being different from that of the start frame to indicate the sun rising or setting. A process (e.g. process 300 described below) can identify the number of intermediate frames that need to be displayed by the media player, and render intermediate effects to the intermediate frames at runtime. The intermediate effects are rendered sequentially in the animation sequence and modified slightly from one intermediate frame to the next intermediate frame so that the animation effect can appear to seamlessly change from the start frame to the end frame. The modification can be achieved by a linear interpolation from one intermediate frame to the next based on the key frames. Alternatively, other forms of interpolation functions can be used, for example, an exponential function, a user-specified function, or a function that is calculated dynamically at runtime. As an example, the dynamically calculated function can be an interpolation function whose rate of change depends on the position of the end user's mouse, the time of day on the host machine, or data coming from a weather server over the interne.

FIG. 3 is a flow chart showing an example process 300 of generating an animation sequence including animation effects by a media player at runtime. At 305, the media player receives the animation file, which can be in a format such as a .swf file. At 310, the media player obtains the animation information from the received animation file. As noted above, the animation information can include primary objects and their associated effect objects to be applied to the primary objects. The animation information can also include the parameters for each effect object. At 315, the media player generates the animation sequence by identifying, at 317, the first frame in the animation sequence. For example, the first frame can correspond to the start frame of a key frame pair in an animation. At 320, the media player produces (e.g., by rendering) the first frame dynamically at runtime using the animation information contained in the first frame.

At 325, the media player determines whether there are more frames to be rendered. If there are more frames, at 330, the media player receives the next frame in the animation file. For example, the next frame can correspond to the end frame of the key frames in an animation. At 335, the media player retrieves the number of intermediate frames previously specified by the user, at 296, in the authoring process (e.g., process 200) of the animation file. At 340, the media player performs an interpolation based on the parameters defined in the key frames using an interpolation function previously specified by the user, at 297, in the authoring process (e.g., process 200) of the animation file. As noted above, the interpolation function can be a linear function, an exponential function, or any function specified by the user. At 345, the media player creates intermediate objects, which are the primary objects associated with the intermediate frames, and intermediate effects, which are the effect objects associated with the intermediate frames. The media player creates the intermediate objects and intermediate effects based on the interpolation performed at 340.

At 350, the media player produces (e.g., by rendering) the intermediate frames sequentially in the animation sequence. At 355, the media player produces (e.g., by rendering) the second frame of the animation file. The media player then determines if there are more frames to be produced. For example, the animation file can include more than one key frame pair. In such case, the second frame (or end frame) of the first key frame pair can be defined as the first frame (or start frame) of the second key frame pair. Thus, for example, as the animation advances between the first and the second frames, the interpolation used in generating intermediate frames is performed relative to the first and second frames. Further, as the animation advance between the second and the third frames, the interpolation used in generating intermediate frames is performed relative to the second and third frames.

In one implementation, an effect object may be defined for a primary object at frame A, frame B, and frame C, which represent the frames in the animation sequence in the order of A, then B, then C. Thus, frames A and B can form a pair of key frames, and frames B and C can form another pair of key frames. As the animation advances between frames A and B, the interpolation described above can be performed relative to frames A and B. As the animation moves between frames B and C, the interpolation described above can be performed relative to frames B and C.

Additionally, referring back to FIG. 2, at 270 and 280, if a dummy effect object is created by the process 200, then the interpolation of the intermediate effects can be performed based on the dummy effect object, which has its parameters set to zero, and a user-defined effect object. In this manner, even though the user may have only defined an effect object for one frame of a pair of key frames, the process 300 can generate intermediate effects and cause the dummy effect object to appear to morph into the user-defined effect object, as the intermediate effect is interpolated from the dummy effect having parameters setting of zero.

Figure 4:
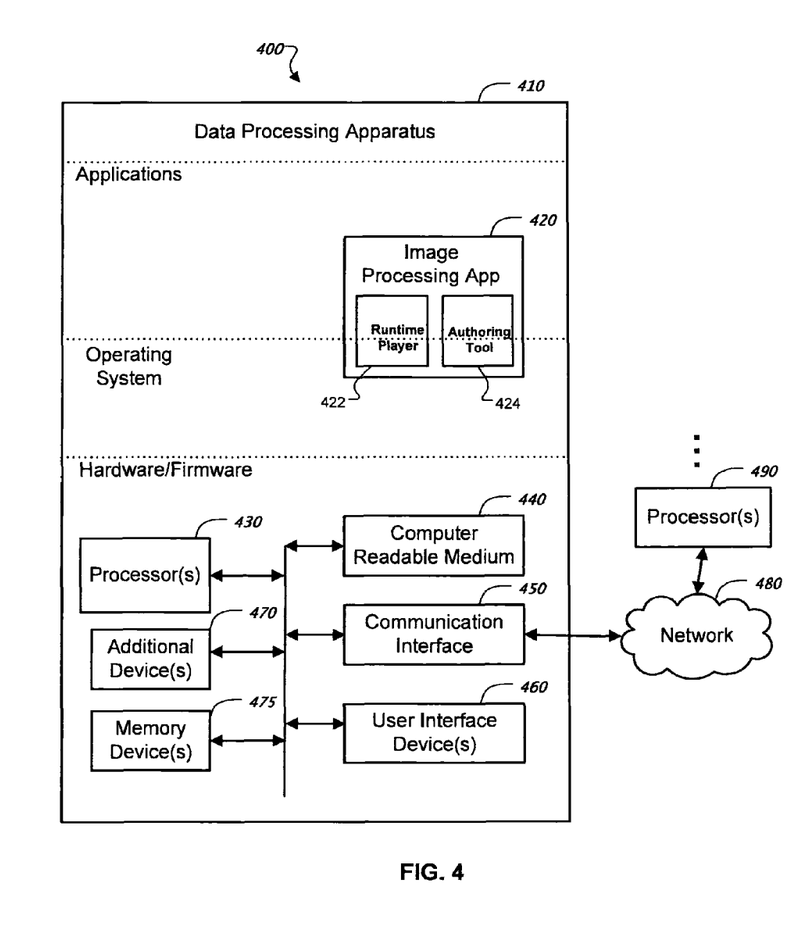
FIG. 4 shows an example system configured to dynamically output animation effects at runtime for animated objects in an animation.

FIG. 4 shows an example system 400 configured to allow a user to author animation effects in an animation by specifying at least one frame of the key frames and generate an animation sequence dynamically at runtime. A data processing apparatus 410 can include hardware/firmware, an operating system and one or more applications, including an image processing application 420. The image processing application can be, for example, a media player, and can include a runtime player 422, an authoring tool 424, or both. As used herein, an application refers to a computer program that the user perceives as a distinct computer tool used for a defined purpose. The image processing application 420 can be built entirely into the operating system (OS) of the data processing apparatus 410, or the image processing application 420 can have different components located in different locations (e.g., one portion in the OS or kernel mode, one portion in the user mode, and one portion in a remote server), and the image processing application 420 can be built on a runtime library serving as a software platform of the apparatus 410. Moreover, the image processing application 420 can be a graphical user interface application (e.g., a Web browser) that connects to one or more processors 490 (e.g., one or more Web servers) over a network 480 and provides the computer tool as a network service.

The image processing application 420 can include animation software (e.g., Adobe® Flash® software, available from Adobe Systems Incorporated of San Jose, Calif.), visual effects software (e.g., Adobe® After Effects® software, available from Adobe Systems Incorporated of San Jose, Calif.), image editing software (e.g., Adobe® Photoshop® software, available from Adobe Systems Incorporated of San Jose, Calif.), and video editing software (e.g., Adobe® Premiere® software, available from Adobe Systems Incorporated of San Jose, Calif.). Thus, the image processing application 420 can operate on digital images from many different sources. Moreover, a digital image (which for brevity will simply be referred to as an image) does not necessarily correspond to a file. An image may be stored in a portion of a file that holds other images, in a single file dedicated to the image in question, or in multiple coordinated files.

The data processing apparatus 410 includes one or more processors 430 and at least one computer-readable medium 440. The data processing apparatus 410 can also include a communication interface 450, one or more user interface devices 460, and one or more additional devices 470 and memory devices 475. The user interface device(s) 460 can include display screen(s), keyboard(s) (e.g., a custom video editing keyboard), mouse, stylus, or any combination thereof. Moreover, the data processing apparatus 410 can itself be considered a user interface device (e.g., when the image processing application 420 is delivered as a Web service).

The additional device(s) 470 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium. Additionally, for displaying of the animation effects, a playback media player (e.g., the Adobe Flash Player) incorporated in devices such as a mobile phone, a set-top box, a handheld device, or other display devices can be used.

Memory device 475 can be a form of random access memory (RAM) such as a dynamic random access memory (DRAM), flash memory, synchronous dynamic random access memory (SDRAM), or other removable storage device. Once properly programmed, the data processing apparatus 410 is operable to allow a user to author animation effects in an animation by specifying at least one frame of the key frames and generate an animation sequence dynamically at runtime.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

Additionally, as noted above, the animation sequence can be frame-based or time-based. An alternative embodiment of the invention can be implemented in a time-based animation. As an example, the user can specify a start time instance (e.g., time=0 minutes and 0 seconds) and an end time instance (e.g., time=3 minutes and 20 seconds). Thus, the animation sequence would have a time duration between the start and end time instances (e.g., 3 minutes and 20 seconds). Further, the user can specify an animation effect associated with either the start time instance or the end time instance. For instance, the user can specify a drop shadow with a certain angle and distance at the start time instance that gradually disappears as the animation approaches the end time instance.

As discussed above for the frame-based animation, in the time-based animation if the user does not specify parameters associated with the shadow effect at the end time instance, then a dummy effect object can be created with the associated parameters set to zero. Similarly, the user can specify a number of intermediate time instances for the animation sequence. For example, the user may specify that an intermediate time instance be created at every 10 second interval. These intermediate time instances are associated with intermediate effects generated dynamically at runtime when a media player plays the animation.

The invention claimed is:

1. A computer-implemented method comprising:
   receiving animation information in a media player, wherein the animation information comprises a primary object and a first effect object; and
   interpolating, dynamically in the media player, between the first effect object and a second effect object to create an intermediate effect applied to the primary object in a predefined number of intermediate frames between a first frame associated with the first effect object and a second frame associated with the second effect object, wherein the method is performed by a computing device, and wherein the predefined number of intermediate frames correspond to intermediate time instances between a first time instance associated with the first effect object and a second time instance associated with the second effect object.

2. The computer-implemented method of claim 1 wherein the interpolating comprises:
   producing the intermediate frames sequentially based on a frame position relative to the first and second frames.

3. The computer-implemented method of claim 1 wherein the interpolating comprises:
   performing an interpolation of the animation information associated with the first and the second frames based on a function selected from a group comprising a linear function, an exponential function and a user specified function.

4. The computer-implemented method of claim 1 wherein the predefined number of intermediate frames comprises a user-specified number of intermediate frames.

5. The computer-implemented method of claim 1 wherein the receiving animation information in the media player comprises:
receiving a specified number of the intermediate time instances.

6. The computer-implemented method of claim 5 wherein the first time instance is produced before the second time instance.

7. The computer-implemented method of claim 5 wherein the second time instance is produced before the first time instance.

8. A computer program product, encoded on a non-transitory computer-readable medium, operable to cause data processing apparatus to perform operations comprising:
receiving animation information in a media player, wherein the animation information comprises a primary object and a first effect object; and
interpolating, dynamically in the media player, between the first effect object and a second effect object to create an intermediate effect applied to the primary object in a predefined number of intermediate frames between a first frame associated with the first effect object and a second frame associated with the second effect object.
wherein the predefined number of intermediate frames correspond to intermediate time instances between a first time instance associated with the first effect object and a second time instance associated with the second effect object.

9. The computer program product of claim 8 wherein the interpolating comprises:
producing the intermediate frames sequentially based on a frame position relative to the first and second frames.

10. The computer program product of claim 8 wherein the interpolating comprises:
performing an interpolation of the animation information associated with the first and the second frames based on a function selected from a group comprising a linear function, an exponential function and a user specified function.

11. The computer program product of claim 8 wherein the receiving animation information in the media player comprises:
receiving a specified number of the intermediate time instances.

12. A system comprising:
a user interface device; and
a media player operable to interact with the user interface device and to perform operations comprising:
receiving animation information, wherein the animation information comprises a primary object and a first effect object; and
interpolating, dynamically in the media player, between the first effect object and a second effect object to create an intermediate effect applied to the primary object in a predefined number of intermediate frames between a first frame associated with the first effect object and a second frame associated with the second effect object,
wherein the predefined number of intermediate frames correspond to intermediate time instances between a first time instance associated with the first effect object and a second time instance associated with the second effect object.

13. The system of claim 12 wherein the interpolating comprises:
producing the intermediate frames sequentially based on a frame position relative to the first and second frames.

14. The system of claim 12 wherein the interpolating comprises:
performing an interpolation of the animation information associated with the first and the second frames based on a function selected from a group comprising a linear function, an exponential function and a user specified function.

15. The system of claim 12 wherein the receiving animation information comprises:
receiving a specified number of the intermediate time instances.

16. A computer-implemented method comprising:
receiving a first frame and a second frame, wherein the first frame comprises a primary object and a first effect object applied to the primary object;
determining whether the first effect object is associated with the second frame;
if the first effect object is not associated with the second frame:
generating a second effect object; and
associating the second effect object with the second frame; and
building an animation file comprising the first effect object, the first frame, the second frame and the second effect object, wherein the animation file can be processed to interpolate between the first effect object and the second effect object to create at least one intermediate effect applied to the primary object,
wherein the method is performed by a computing device.

17. The computer-implemented method of claim 16 wherein generating the second effect object comprises obtaining one or more parameters for an animation effect associated with the first effect object.

18. The computer-implemented method of claim 17 wherein generating the second effect object further comprises associating the one or more parameters with the second effect object and defining the one or more parameters to be a predetermined value.

19. The computer-implemented method of claim 18 wherein the predetermined value facilitates a smooth transition between the first and second effect objects.

20. The computer-implemented method of claim 16 wherein associating the second effect object with the second frame comprises applying the second effect object to the primary object in the second frame.

21. The computer-implemented method of claim 16 wherein the second effect object is of a same effect type as the first effect object.

22. The computer-implemented method of claim 16 wherein generating the second effect object comprises linking the first effect object to the second effect object to create the at least one intermediate effect applied to the primary object.

23. The computer implemented method of claim 16 wherein the at least one intermediate effect is generated based on one or more parameters associated with the second effect object and one or more parameters associated with the first effect object.

* * * * *